United States Patent [19]
Saget et al.

[11] Patent Number: 5,816,019
[45] Date of Patent: Oct. 6, 1998

[54] HEAT-SEALING MACHINE

[75] Inventors: Didier Saget; Daniel Mongin, both of Le Perreux, France

[73] Assignee: Formfil, Le Perreux, France

[21] Appl. No.: 754,246

[22] Filed: Nov. 20, 1996

[51] Int. Cl.⁶ .................................................. B65B 51/10
[52] U.S. Cl. ...................... 53/373.9; 156/309.9; 156/499
[58] Field of Search ................................ 156/499, 309.9; 53/373.8, 373.9

[56] References Cited

U.S. PATENT DOCUMENTS

| | | | |
|---|---|---|---|
| 2,423,237 | 7/1947 | Haslacher . | |
| 2,587,422 | 2/1952 | Wills . | |
| 3,084,489 | 4/1963 | Seeluth | 53/373.9 |
| 3,402,089 | 9/1968 | Seaman . | |
| 3,562,920 | 2/1971 | Vuilleumier et al. . | |
| 3,801,266 | 4/1974 | Austin . | |
| 3,823,306 | 7/1974 | Davis | 53/376.6 |
| 3,953,272 | 4/1976 | Webber | 53/373.9 |
| 4,260,447 | 4/1981 | Muscariello | 53/373.5 |
| 4,555,296 | 11/1985 | Burtch et al. | 156/446 |
| 4,606,784 | 8/1986 | Glans et al. | 156/200 |
| 4,834,828 | 5/1989 | Murphy . | |
| 5,562,795 | 10/1996 | Landrum et al. | 53/373.9 |

FOREIGN PATENT DOCUMENTS

| | | |
|---|---|---|
| 0 557 537 | 9/1993 | European Pat. Off. . |
| 2.022.746 | 10/1969 | France . |
| 2.126.770 | 10/1972 | France . |
| 1 106 591 | 5/1961 | Germany . |
| 1 192 813 | 5/1965 | Germany . |
| 2 423 748 | 12/1974 | Germany . |
| 0148404 | 6/1991 | Japan ...................................... 53/373.9 |
| 882740 | 11/1961 | United Kingdom . |
| 1 396 502 | 6/1975 | United Kingdom . |

OTHER PUBLICATIONS

DVS, Technical Committee, "Joining of lining membranes made from polymeric materials (geomembranes) in geotechnical and hydraulic application–welding, bonding by adhesives, vulcanizing", Welding in the World, Jul./Aug. 1992, vol. 30, No. 7/8, pp. 174–181.

*Primary Examiner*—James F. Coan
*Assistant Examiner*—Gene L. Kim
*Attorney, Agent, or Firm*—Young & Thompson

[57] ABSTRACT

The invention relates to a hot air heat-sealing machine for heat-sealing at least two pieces of heat-sealable material, and comprising:

a heat source designed to deliver hot air along a projection axis at a predetermined point relative to pieces to be heat-sealed;

presser means for pressing the two pieces to be heat-sealed against each other, the heat source being placed upstream from the presser means; and drive means and guide means for driving and guiding the pieces along a guide axis in a guide direction going towards the heat source, the pieces being guided so that they face each other and are spaced apart from each other, such that when they pass the heat source it lies between the two facing pieces to be heat-sealed.

9 Claims, 4 Drawing Sheets

HEAT-SEALING MACHINE

DESCRIPTION

The invention relates to a nozzle forming a heat source for blowing hot air and designed to be positioned between two plane pieces that are to be heat-sealed and that are placed facing each other, the nozzle serving to deliver hot air along an air-delivery axis at a point that is predetermined relative to the pieces to be heat-sealed. The invention also relates to a hot air heat-sealing machine for heat-sealing the pieces, and including such a nozzle.

BACKGROUND OF THE INVENTION

Such nozzles forming sources of heat are known comprising a base which is in communication with a hot air feed duct and a nose which is integral with the base and which serves to blow hot air received from the duct in a desired direction on the air-delivery axis.

Such nozzles are shown in particular by the following documents: U.S. Pat. No. 1,396,502; U.S. Pat. No. 2,587,422; DE-1 192 813; the journal Welding in the World, Vol. 30, No. 7/08, Jul. 1, 1992, pages 774 to 981; DE-2 423 748; FR-2 022 746; and finally U.S. Pat. No. 2,423,237.

Nevertheless, in all those documents other than the last-mentioned, the structure of the nozzle does not enable the pieces to be heat-sealed to be heated intermittently while maintaining a constant temperature level in the nozzle.

Document U.S. Pat. No. 2,423,237 describes a nozzle that includes a valve positioned on the top face of the nozzle and controlled by a spring. The valve makes it possible optionally to direct hot air coming from the feed duct in a direction other than the desired direction which is towards the pieces to be heat-sealed.

However, the nozzle structure as described in that document does not enable the nozzle to be placed between the pieces to be heat-sealed while also enabling hot air to be exhausted in a direction other than towards the pieces to be heat-sealed.

The documents mentioned above also relate to heat-sealing machines comprising:

- a heat source designed to deliver hot air along a projection axis at a predetermined point relative to pieces to be heat-sealed;
- presser means for pressing the two pieces to be heat-sealed against each other,
- the heat source being placed upstream from the presser means; and
- drive means and guide means for driving and guiding the pieces along a guide axis in a guide direction going towards the heat source, the pieces being guided so that they face each other and are spaced apart from each other, such that when they pass the heat source it lies between the two facing pieces to be heat-sealed.

However, the machines described in those documents are unsuitable for performing heat-sealing adapted to different materials being used with the same apparatus.

Also, they show configurations that do not enable heat-sealing to be performed intermittently, i.e. a series of heat-sealing operations, without the temperature level present in the nozzle being changed and thus requiring renewed lengthy adjustment which cannot be adapted to a series of heat-sealing operations, for example.

In addition, the configurations described in the above-mentioned documents require apparatus that is bulky and expensive, and in which the positioning of the two pieces to be heat-sealed must be maintained accurately throughout the entire duration of heat source displacement and of heat-sealing.

Heat-sealing machines making use of ultrasound are also known, but they require major investment which is out of proportion with the context of flat forming which is the most common kind of use in the field of heat-sealing.

The state of the art is also illustrated by the documents U.S. Pat. No. 2,466,735 and U.S. Pat. No. 3,413,175.

OBJECTS AND SUMMARY OF THE INVENTION

The invention thus seeks to mitigate the above-mentioned drawbacks.

An object of the invention is to provide a nozzle forming a source of heat and as described at the beginning of the present text, making it possible to obtain and to continuously maintain a heat-sealing temperature adapted to the type of material used, and capable of being positioned between two pieces to be heat-sealed.

Another object of the invention is to provide a heat-sealing machine including such a nozzle, the machine being compact and enabling the user to select the type of material that is to be used and the thickness of the material that is to be used, and thus to perform heat-sealing appropriately, by the nozzle being put into action intermittently.

To this end, the invention provides a nozzle forming a heat source for blowing hot air and designed to be positioned between two plane pieces that are to be heat-sealed and that are placed facing each other, the nozzle serving to deliver hot air along an air-delivery axis at a point that is predetermined relative to the pieces to be heat-sealed, the nozzle comprising a base which is in communication with a hot air feed duct and a nose which is integral with the base and which serves to blow hot air received from the duct in a desired direction on the air-delivery axis, wherein the nose is suitable for being positioned between the two pieces to be heat-sealed, and the nozzle including a flap valve formed on the top face of the base, which valve, when opened, causes hot air to be exhausted along an exhaust direction different from the desired direction.

The invention also provides a hot air heat-sealing machine for heat-sealing at least two plane pieces of heat-sealable material, as described above, wherein the heat source includes a nozzle of the invention and wherein the machine further includes a control device for controlling the heat source to act intermittently relative to the pieces to be heat-sealed as a function of a signal delivered by at least one position detector for detecting the passage of the pieces to be heat-sealed at a predetermined point and for transmitting corresponding information to the control device, opening and closing of the valve of the nozzle being controlled by the control device as a function of the information it receives from the position detector(s).

BRIEF DESCRIPTION OF THE DRAWINGS

Other characteristics of the invention appear from the following description given with reference to the accompanying drawings, in which.

MORE DETAILED DESCRIPTION

Figure 1:
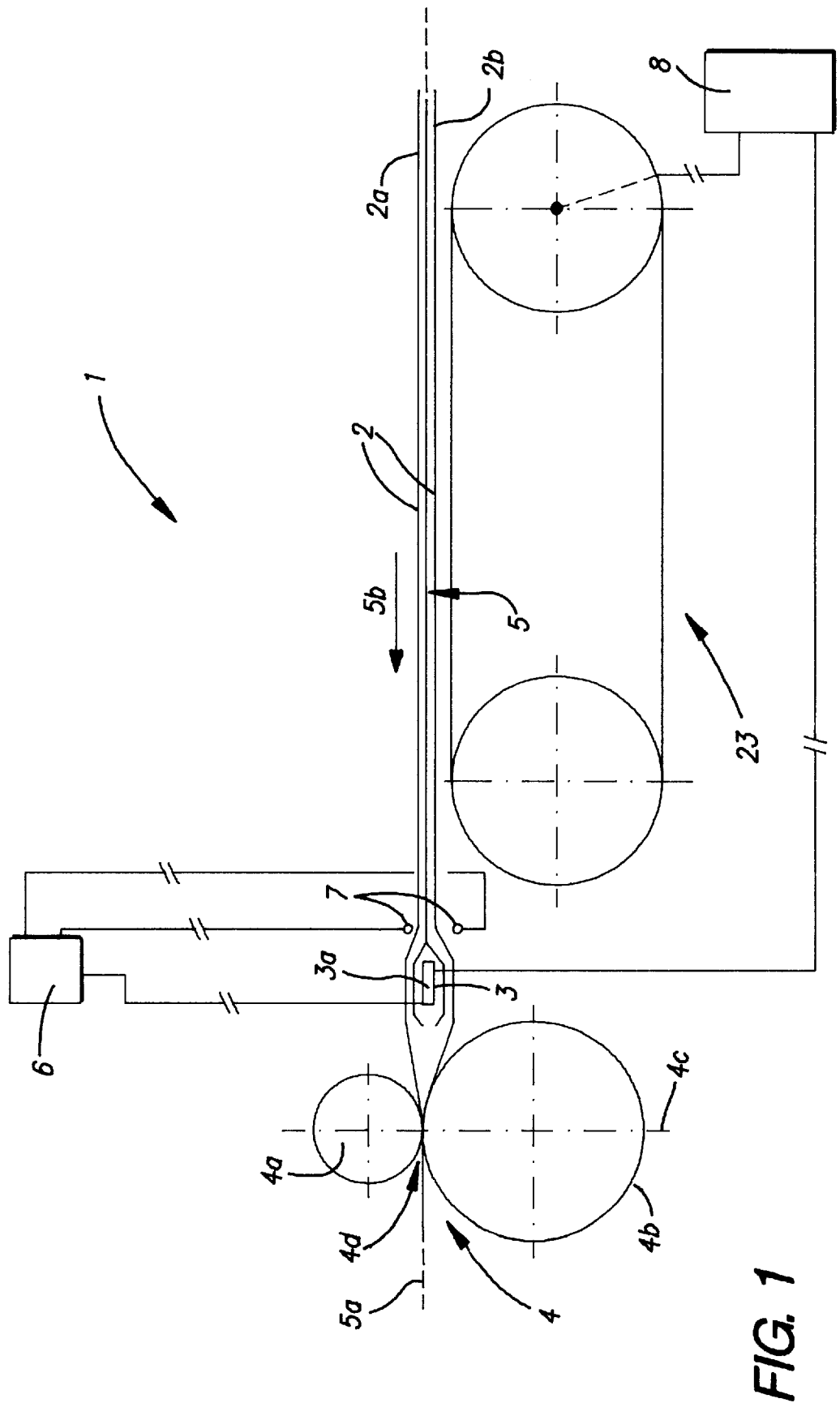
FIG. 1 is an overall diagram of the heat-sealing machine of the invention.
Figure 2:
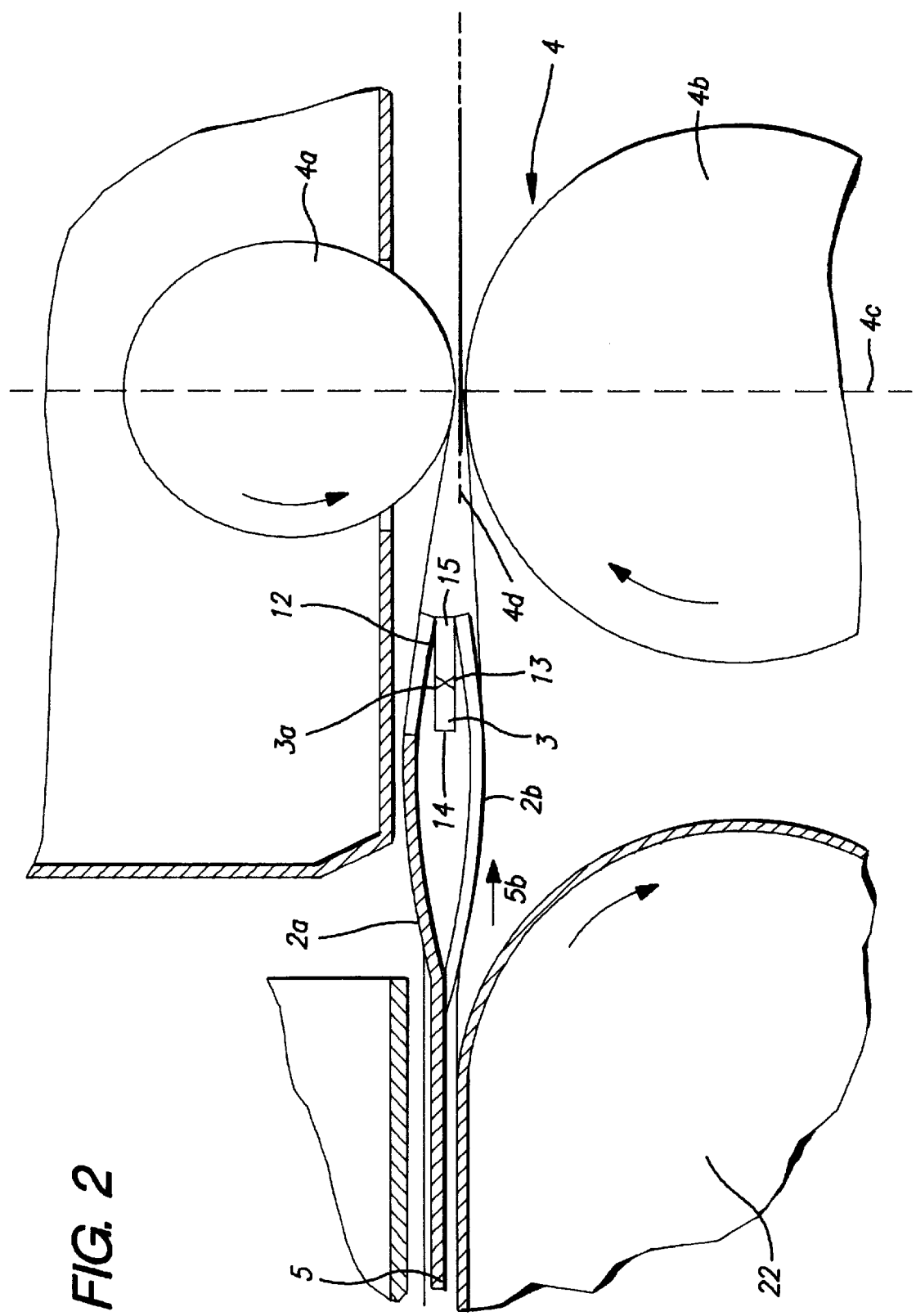
FIG. 2 is an enlarged profile view of the heating and pressing portion of the heat-sealing machine of FIG. 1.
Figure 3:
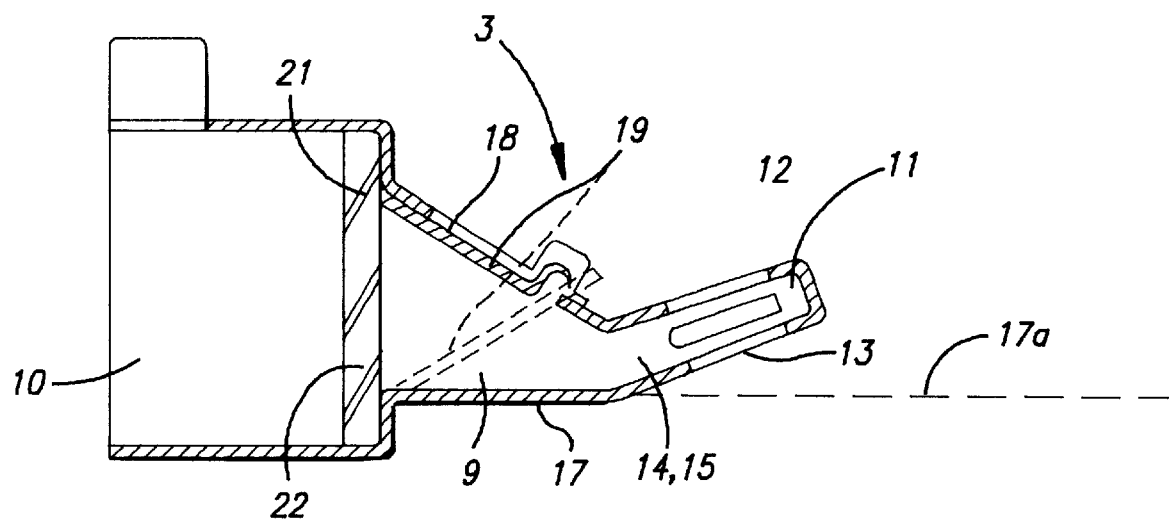
FIG. 3 is a profile view of a nozzle of the invention constituting a source of heat.
Figure 4:
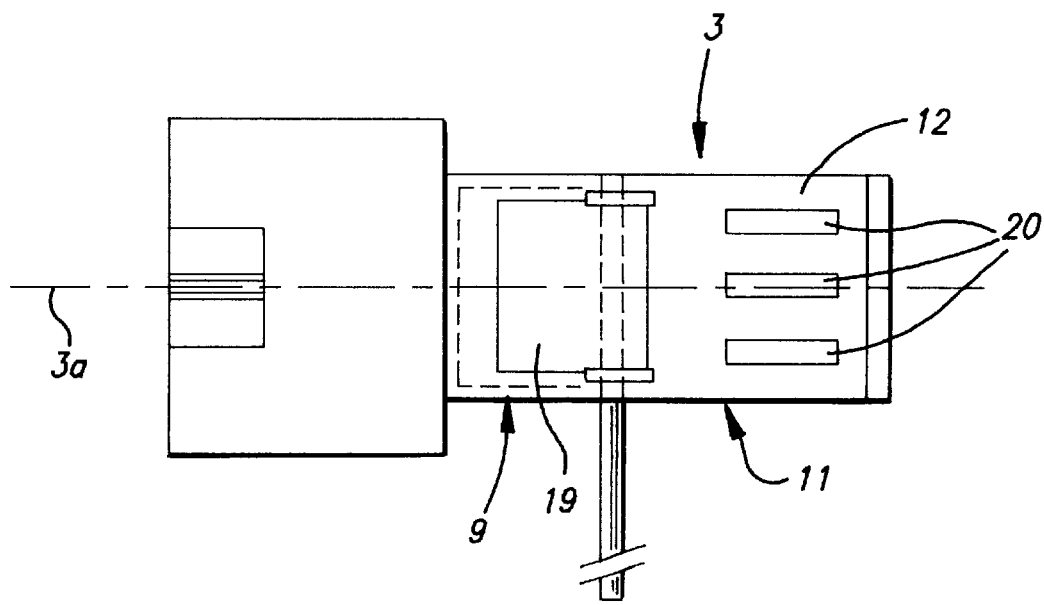
FIG. 4 is a plan view of the nozzle shown in FIG. 3 and constituting a source of heat.

FIG. 1 shows a heat-sealing machine 1 for heat-sealing pieces 2 made of heat-sealable material.

The materials used are of the plastics type and more generally of any synthetic substance that can be caused to adhere when hot.

In the embodiment shown, the heat-sealable pieces 2 are a top sheet 2a and a bottom sheet 2b. Nevertheless, pieces of other shapes can be envisaged so long as the heat-sealing can be performed flat.

The heat-sealing machine 1 includes a source of heat 3 having an air-delivery axis 3a defined by the direction in which hot air is blown, the source of heat 3 being intended to deliver hot air to a predetermined point of the pieces to be heat-sealed.

Presser means 4 enable the two sheets 2a and 2b that are to be heat-sealed to be pressed against each other. These presser means 4 are of known type, and they are constituted, in particular, by two rollers, a top roller 4a and a bottom roller 4b, with the pieces to be heat-sealed passing between them, which rollers are placed on an axis 4c extending substantially perpendicularly to the longitudinal axis of the sheets 2a and 2b so as to establish a pressing axis 4d defined by the section where the two rollers come into contact. The heat source 3 is placed upstream from the presser means 4.

The heat-sealing machine 1 also includes drive means 23 and guide means 5 serving to drive and guide the sheets 2a and 2b. Guidance is performance along a guide axis 5a parallel to the axis of the sheets and in a guide direction 5b that goes towards the heat source 3.

The drive means 23 and the guide means 5 are of known design. Together they enable the sheets 2a and 2b to be guided and driven so that they face each other while being spaced apart.

The guide axis 5a coincides with the pressing axis 4d.

The sheets are guided on the guide means 5 so that they face each other and are spaced apart from each other in such a manner that where they go past the heat source 3, the heat source is situated between the two facing sheets 2a and 2b.

The sheets 2a and 2b are thus placed on the guide means 5 in such a manner that their respective inside faces face each other and are spaced apart from each other. When the heat-sealing machine 1 is in operation, the sheets 2a and 2b are moved in the guide direction 5b towards the heat source 3. At the heat source 3, the guide means 5 are shaped so that the top sheet 2a passes over the heat source 3 and the bottom sheet 2b passes under the heat source 3, thus ensuring that the heat source lies between the two sheets to be heat-sealed and more particularly between the two inside faces thereof. The hot air delivered by the heat source 3 enables each sheet to be heated on its inside face so that they are then pressed against each other by the presser means 4 while they are at the desired temperature to enable them to be heat-sealed to each other.

For better accuracy in bonding the sheets together, the heat source 3 is mounted close to the presser means 4.

The pieces to be heat-sealed may be plane pieces, in particular sheets, of various thicknesses. Their thickness may lie in particular in the range 0.3 mm to 2 mm, and is preferably in the range 0.5 mm to 1.2 mm.

In order to blow heat accurately and in the right direction, the air-delivery axis 3a of the heat source 3 is substantially perpendicular to the guide axis 5a of the guide means 5.

In accordance with the invention and in order to simplify use of the heat-sealing machine 1, the machine is automated as a function of certain criteria.

To this end, the heat-sealing machine 1 further includes a control device 6 for causing the heat source 3 to operate intermittently as a source of heat for the pieces 2 to be heat-sealed. This control device 6 is informed about the passage of the pieces to be heat-sealed by means of at least one position detector 7 placed upstream from the heat source 3 relative to the guide axis 5a and designed to detect passage at a predetermined point of at least one of the pieces to be heat-sealed and to transmit corresponding information to the control device 6.

If only one position detector 7 is used, the passage of only one of the pieces to be heat-sealed will be detected, in which case it is essential to position the two pieces 2a and 2b at the beginning of the guide means 5 in the precise position in which they are to be heat-sealed.

Nevertheless, it is possible to have a plurality, and in particular two, position detectors 7 associated respectively with the top sheet 2a and the bottom sheet 2b. This disposition makes it possible for the control device 6 to achieve better control accuracy at the beginning of heat-sealing.

The connections between the detector(s) 7 and the control device 6, and also between the heat source 3 and the control device 6 are represented diagrammatically. They may be constituted by electrical connections or by electromechanical connections, in particular.

It is also possible to control the quantity of heat delivered by the heat source 3 and the drive speed of the pieces 2a and 2b as guided by the guide means 5.

To this end, the heat-sealing machine may also include management means 8 connected firstly to the drive means 23 and secondly to the heat source 3, and designed to determine the quantity of heat delivered by the heat source 3 and the drive speed of the sheets as guided by the guide means 5 as a function of the nature of the material used for the pieces 2a and 2b that are to be heat-sealed.

The heat-sealing machine can thus be adapted to various types of material without having its configuration changed.

Provision may also be made for the management means 8 to be connected to the control device 6.

For example, when heat-sealing several pairs of sheets 2a and 2b in series, the sheet drive speed and the intermittent heating state of the heat source 3 may be controlled as a function of detection performed by the detectors 7.

In addition, the detectors 7 can be positioned at a certain distance from the heat source 3 so as to avoid being heated. Under such circumstances, the control device 6 includes timing means (not shown) enabling the heating state of the heat source 3 to be timed not only at the beginning of bonding but also at the end.

Here again, the connections between the management means 8, the drive means 23, and the heat source 3 are represented diagrammatically and can be constituted, in particular, by electrical type connections or by electromechanical type connections.

The control device 6 and the management means 8 are conventional and do not require further description.

Concerning the quantity of heat delivered, it is possible to use a propelled heat source capable of delivering heat in the range 150° C. to 600° C.

The heat source 3 of the invention is described in greater detail below.

The heat source 3 is a nozzle for blowing hot air and it comprises a base 9 which is in communication with a hot air feed duct 10, and a nose 11 which is integral with the base 9 and which blows the hot air received by the base over the pieces to be heat-sealed and in a desired direction, i.e. substantially perpendicularly to the guide axis 5a.

To enable heating to be performed intermittently without needing to alter the internal temperature of the nozzle, the nozzle includes a flap valve 19 formed on the top face 18 of the base 9 which, when opened, causes the hot air to be exhausted in an exhaust direction different from said desired direction. To enable this change of direction, the flap opens towards the inside of the base, thereby closing off the passage going towards the nose 11 of the nozzle and thus causing the hot air jet to change direction.

Thus, in fact, the nozzle is in its heating state when the valve 19 is in a closed position in which the direction of the hot air jet is not changed.

To ensure that the hot air is blown properly in the appropriate direction, the nose 11 of the nozzle 3 is in the form of a parallelepiped of substantially rectangular cross-section. It is thus defined by a top face 12 directed towards the top sheet 2a and a bottom face 13 directed towards the bottom sheet 2b, and also by two side faces 14 and 15. When the axis 3a of the heat source 3 is substantially perpendicular to the axis 5a of the guide means 5, a first side face 14 of the nose 11 faces towards the guide means 5 and the second side face 15 of the nose 11 faces towards the presser means 4.

The base 9 of the nozzle 3 has a right section that tapers towards the nose 11 and thus has a bottom face 17 defining a plane 17a that slopes relative to the plane defined by the guide means 5, and a top face 18 that slopes down towards the nose 11.

In order to avoid having the jet of hot air striking directly against the sheets to be heat-sealed, the nose 11 of the nozzle 3 slopes relative to the plane 17a defined by the bottom face 17 of the base 9, so that once the nozzle is in position, the bottom face 13 of the nose defines a plane parallel to the plane defined by the guide means.

The valve 19 is opened and closed by the control device 6 as a function of information it receives from the position detector(s) 7.

Figure 6:
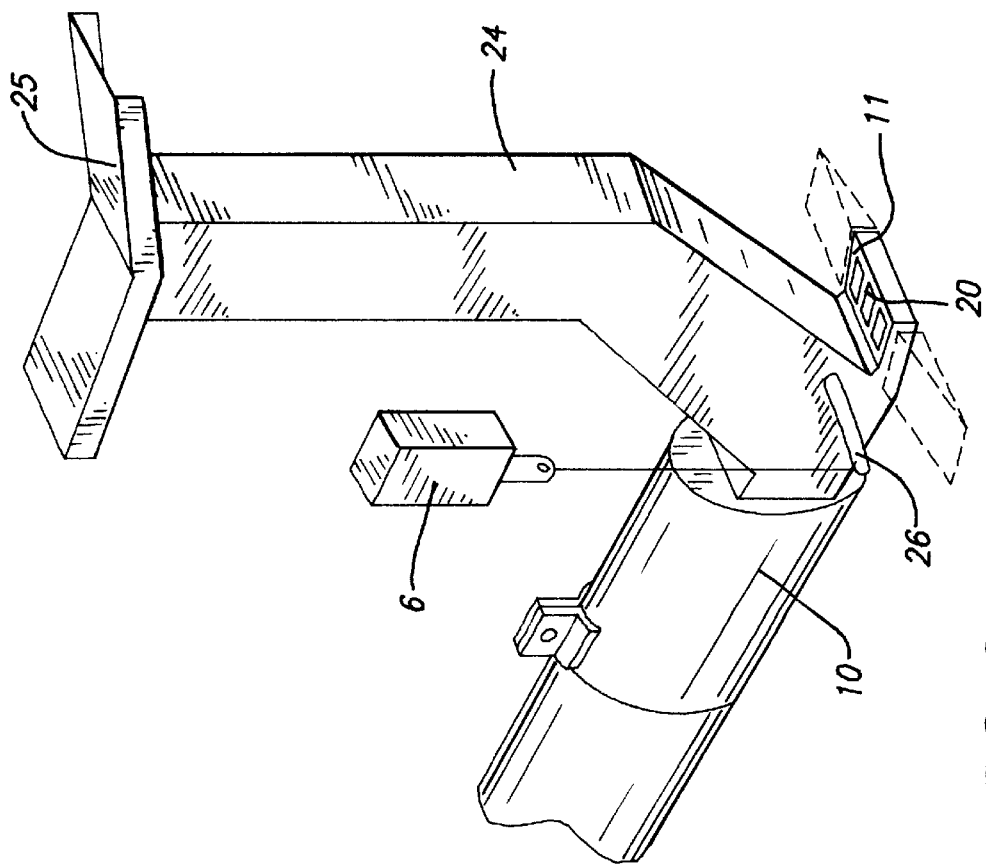
FIG. 6 is a diagrammatic perspective view of an embodiment of the nozzle of the invention constituting a source of heat.

This control is performed electromechanically, in particular. For example, as shown in FIG. 6, the valve 19 is opened and closed under the control of an electromagnet 6 which receives positioning information concerning the sheets 2a and 2b from the detectors 7. It is also possible for such opening and closing to be subject to a time delay by implementing timing means (not shown).

To exhaust hot air, an air dispersing chimney 24 is placed on the top face 18 of the base 9. The end of the chimney 24 remote from the top face 18 includes safety deflectors 25.

The valve 19 is opened and closed under the control of the electromagnet acting on a lever 26.

To obtain better diffusion of hot air towards the pieces to be heat-sealed, the nozzle 3 includes perforations 20 formed in at least one of the faces 12, 13, and 15 of the nose 11 of the nozzle. The hot air must travel vertically towards the top sheet 2a and towards the bottom sheet 2b, and it must also travel horizontally towards the presser means 4.

There is no point in diffusing the hot air upstream from the hot air source.

To this end, the perforations 20 may be provided respectively in the top face 12 and the bottom face 13 of the nose 11 and on the side face 13 looking towards the presser means 4.

These perforations are preferably oblong in shape.

Figure 5:
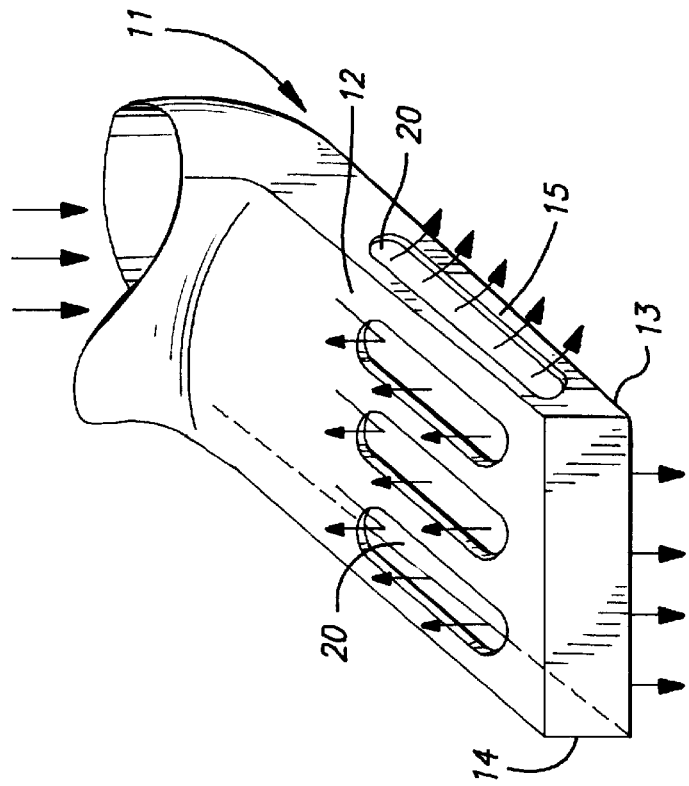
FIG. 5 is a perspective view of the end portion of the nozzle shown in FIGS. 3 and 4 and constituting a source of heat.

For greater clarity, FIG. 5 has arrows representing the various directions in which hot air propagates in the vicinity of the nose 11.

Finally, for better distribution of the hot air to be blown, the nozzle 3 includes deflection vanes 21 mounted inside the nozzle 3 at the junction 22 between the base 9 and the nozzle 3 and the hot air feed duct 10.

Naturally, the structure of the nozzle 3 as described above may be adapted to other types of heat-sealing machine providing the nozzle needs to be positioned between the two pieces that are to be bonded together.

We claim:

1. A hot air heat-sealing machine for heat-sealing at least two plane pieces of heat-sealable material, the machine comprising:

a heat source designed to deliver hot air along a projection axis at a predetermined point relative to pieces to be heat-sealed;

presser means for pressing the two pieces to be heat-sealed against each other, the heat source being placed up stream from the presser means; and drive means and guide means for driving and guiding the pieces along a guide axis in a guide direction going towards the heat source, the pieces being guided so that they face each other and are spaced apart from each other, such that when they pass the heat source it lies between the two facing pieces to be heat-sealed, wherein the heat source comprises a nozzle comprising a base which is in communication with a hot air feed duct and a nose which is integral with the base and which serves to blow hot air received from the duct in a desired direction on the air-delivery axis, wherein the nose is suitable for being positioned between the two pieces to be heat-sealed, and the nozzle including a flap valve formed on the top face of the base, which valve, when opened, causes hot air to be exhausted along an exhaust direction different from the desired direction and wherein the machine further includes a control device for controlling the heat source to act intermittently relative to the pieces to be heat-sealed as a function of a signal delivered by at least one position detector for detecting the passage of the pieces to be heat-sealed at a predetermined point and for transmitting corresponding information to the control device, opening and closing of the valve of the nozzle being controlled by the control device as a function of the information it receives from the position detector.

2. A heat-sealing machine according to claim 1, wherein the air-delivery axis is substantially perpendicular to the guide axis.

3. A heat-sealing machine according to claim 1, further including management means for determining the quantity of heat to be delivered by the heat source and the drive speed of the pieces to be heat-sealed as guided by the guide means, as a function of the nature of the material for the pieces to be heat-sealed.

4. A heat-sealing machine according to claim 1, wherein the guide means are designed to receive plane pieces of various thicknesses.

5. A hot air heat-sealing machine according to claim 1, wherein the nose is of parallelepiped shape, having a cross-section that is substantially rectangular and defined by a top face, a bottom face, and two side faces.

6. A hot air heat-sealing machine according to claim 1, wherein the base is of right section that tapers towards the nose being defined by a bottom face defining a plane that is inclined relative to the plane defined by the pieces to be heat-sealed, and its top face being inclined downwards towards the nose.

7. A hot air heat-sealing machine according to claim 6, wherein the nose is inclined relative to the plane defined by the bottom face of the base.

8. A hot air heat-sealing machine according to claim 1, including hot air diffusing perforations formed in at least one of the faces of the nose.

9. A hot air heat-sealing machine according to claim 1, including internally-mounted deflection vanes at a junction between the base and the hot air feed duct, serving to provide better distribution of the hot air to be blown.

* * * * *